(12) United States Patent
Wong et al.

(10) Patent No.: US 10,136,420 B2
(45) Date of Patent: Nov. 20, 2018

(54) METHODS AND SYSTEMS FOR SIGNALING DYNAMIC NETWORK ASSISTED INFORMATION TO A USER EQUIPMENT

(71) Applicants: Shin Horng Wong, Chippenham (GB); Teck Hu, Melbourne, FL (US); Zhang Min, Swindon (GB)

(72) Inventors: Shin Horng Wong, Chippenham (GB); Teck Hu, Melbourne, FL (US); Zhang Min, Swindon (GB)

(73) Assignees: NOKIA OF AMERICA CORPORATION, Murray Hill, NJ (US); ALCATEL LUCENT, Boulogne-Billancourt (FR)

( * ) Notice: Subject to any disclaimer, the term of this patent is extended or adjusted under 35 U.S.C. 154(b) by 24 days.

(21) Appl. No.: 14/497,361

(22) Filed: Sep. 26, 2014

(65) Prior Publication Data

US 2016/0095089 A1 Mar. 31, 2016

(51) Int. Cl.
*H04W 72/04* (2009.01)
*H04W 72/08* (2009.01)

(52) U.S. Cl.
CPC ........ *H04W 72/042* (2013.01); *H04W 72/082* (2013.01)

(58) Field of Classification Search
None
See application file for complete search history.

(56) References Cited

U.S. PATENT DOCUMENTS

| 2011/0302480 A1* | 12/2011 | Cheng | H04B 7/0452 |
| | | | 714/800 |
| 2014/0334403 A1* | 11/2014 | Park | H04J 11/005 |
| | | | 370/329 |
| 2015/0043396 A1* | 2/2015 | Ekpenyong | H04L 5/0094 |
| | | | 370/280 |
| 2015/0215017 A1* | 7/2015 | Yum | H04B 7/0473 |
| | | | 370/328 |

FOREIGN PATENT DOCUMENTS

EP 2590350 A1 * 5/2013 ......... H04L 27/2602

OTHER PUBLICATIONS

"3rd Generation Partnership Project; Technical Specification Group Radio Access Network; Evolved Universal Terrestrial Radio Access (E-UTRA); Physical channels and modulation (Release 12)," V12.2.0, Jun. 2014.

* cited by examiner

*Primary Examiner* — Yemane Mesfin
*Assistant Examiner* — Jeff Banthrongsack
(74) *Attorney, Agent, or Firm* — Harness, Dickey & Pierce, P.L.C.

(57) ABSTRACT

At least one example embodiment discloses a system including a network element configured to transmit at least first downlink control information and second downlink control information to a first user equipment (UE) being served by a serving cell, the first downlink control information associated with a first identification and the second downlink control information associated with a second identification, and the second downlink control information corresponding to at least one interfering source.

19 Claims, 8 Drawing Sheets

METHODS AND SYSTEMS FOR SIGNALING DYNAMIC NETWORK ASSISTED INFORMATION TO A USER EQUIPMENT

BACKGROUND

Long-Term Evolution (LTE)-Advanced provides a control channel known as the Enhanced Physical Downlink Control Channel (EPDCCH). Moreover, a PDCCH may be provided.

Network Assisted Interference Cancellation & Suppression (NAICS) provides assistance information (NA-Info) to a victim user equipment (UE) in the form of transmission parameters from an interferer cell to a victim cell for the inter-site cells and hence the NA-info consists of semi-static parameters. Parameters that are dynamic are blindly decoded by the victim UE. To help the victim UE in blind decoding, some subset restrictions on these parameters are employed at the interferer.

SUMMARY

At least one example embodiment discloses a system including a network element configured to transmit at least first downlink control information and second downlink control information to a first user equipment (UE) being served by a serving cell, the first downlink control information associated with a first identification and the second downlink control information associated with a second identification, and the second downlink control information corresponding to at least one interfering source.

In an example embodiment, the second downlink control information is associated with at least one interfering cell.

In an example embodiment, the second downlink control information is associated with a second UE.

In an example embodiment, the network element is configured to transmit the second downlink control information to the second UE.

In an example embodiment, the second downlink control information is associated with scheduling information for the at least one interfering UE.

In an example embodiment, a structure of the first downlink control information is the same as a structure of the second downlink control information.

In an example embodiment, the network element is configured to transmit the first downlink control information and the second downlink control information in a same candidate search space for the first UE.

In an example embodiment, the network element is configured to transmit a signal to the UE, the signal indicates the second downlink control information is in a subset of a candidate search space associated with the first downlink control information, the subset being less than all of the candidate search space.

In an example embodiment, the network element is configured to transmit a signal to the UE, the signal indicates the second downlink control information is in a first candidate search space, the first candidate search space partially overlaps a second candidate search space, the second candidate search space being associated with the first downlink control information.

In an example embodiment, the network element is configured to transmit a signal to the UE, the signal indicates the second downlink control information is in a first candidate search space, the first candidate search space is separate from a second candidate search space, the second candidate search space being associated with the first downlink control information.

In an example embodiment, the second downlink control information corresponds to at least a second UE and a third UE.

In an example embodiment, the at least the second UE and the third UE are configured to implement at least a same portion of encoding.

In an example embodiment, the network element is configured to transmit a signal to the UE, the signal indicates a number of downlink control information sets in a candidate search space for the first UE.

At least one example embodiment discloses a user equipment (UE) including a processor configured to receive at least first downlink control information and second downlink control information from a network element, the second downlink control information corresponding to at least one interfering source, the first downlink control information being different than the second downlink control information.

In an example embodiment, the processor is configured to decode the first downlink control information using an Enhanced Physical Downlink Control Channel (EPDCCH) identification and the processor is configured to decode the second downlink control information based on a search space.

In an example embodiment, the processor is configured to decode the first downlink control information using a Physical Downlink Control Channel (PDCCH) identification and the processor is configured to decode the second downlink control information based on a search space of one of the PDCCH and an Enhanced Physical Downlink Control Channel (EPDCCH).

In an example embodiment, the first identification and the second identification are different.

At least one example embodiment discloses a method of transmitting control information. The method includes obtaining a first scrambling identification and a second scrambling identification, transmitting the first scrambling identification and a second scrambling identification to a first user equipment and transmitting at least first downlink control information and second downlink control information to the first UE, the second downlink control information corresponding to at least one interfering source, the first downlink control information being associated with the first scrambling identification and the second downlink control information being associated with the second scrambling identification.

In an example embodiment, the second downlink control information is associated with at least one interfering cell.

In an example embodiment, the second downlink control information is associated with a second UE.

In an example embodiment, the network element is configured to transmit the second downlink control information to the second UE.

In an example embodiment, a structure of the first downlink control information is the same as a structure of the second downlink control information.

In an example embodiment, the second downlink control information is associated with scheduling information for the at least one interfering UE.

In an example embodiment, the transmitting the at least first downlink control information and second downlink control information transmits the first downlink control information and the second downlink control information in a same candidate search space for the first UE.

In an example embodiment, the transmitting the at least first downlink control information and second downlink control information transmits a signal to the UE, the signal indicates the second downlink control information is in a subset of a candidate search space associated with the first downlink control information, the subset being less than all of the candidate search space.

In an example embodiment, the transmitting the at least first downlink control information and second downlink control information transmits a signal to the UE, the signal indicates the second downlink control information is in a first candidate search space, the first candidate search space partially overlaps a second candidate search space, the second candidate search space being associated with the first downlink control information.

In an example embodiment, the transmitting of at least first downlink control information and second downlink control information transmits a signal to the UE, the signal indicates the second downlink control information is in a first candidate search space, the first candidate search space is separate from a second candidate search space, the second candidate search space being associated with the first downlink control information.

In an example embodiment, the second downlink control information corresponds to at least a second UE and a third UE.

In an example embodiment, at least the second UE and the third UE are configured to implement at least a same portion of encoding.

In an example embodiment, the transmitting of at least first downlink control information and second downlink control information transmits a signal to the UE, the signal indicates a number of downlink control information sets in a candidate search space for the first UE.

In an example embodiment, the first identification and the second identification are different.

BRIEF DESCRIPTION OF THE DRAWINGS

Example embodiments will be more clearly understood from the following detailed description taken in conjunction with the accompanying drawings. FIGS. 1A-5 represent non-limiting, example embodiments as described herein.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: existing radio access network (RAN) elements, such as eNBs; and/or existing Evolved Packet Core (EPC) network elements, such as mobile management entities (MMEs), packet data network (PDN) gateways (PGWs), serving gateways (SGWs), servers, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), etc., and describes a transceiver in communication with and providing wireless resources to users in a geographical coverage area. As discussed herein, eNBs may have all the functionality associated with conventional, well-known base stations in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to eNB (or network), whereas downlink (or forward link) transmissions refer to transmissions from eNB (or network) to UE.

According to example embodiments, the PGWs, SGWs, MMEs, UEs, eNBs, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein a MME, PGW and/or SGW may be any well-known gateway or other physical computer hardware system. The MME, PGW and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., MME, PGW, SGW, eNBs, etc.); and to transmit/receive (wireline or wirelessly) controls signals via a control plane or interface to/from other network elements.

The MME, PGW and/or SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The eNBs, as discussed herein, may also include one or more processors, various interfaces including one or more transmitters/receivers connected to one or more antennas, a computer readable medium, and (optionally) a display device. The one or more interfaces may be configured to transmit/receive (wireline and/or wirelessly) data or controls signals via respective data and control planes or interfaces to/from one or more switches, gateways, MMEs, controllers, other eNBs, UEs, etc.

As discussed herein, the PGW, SGW, and MME may be collectively referred to as Evolved Packet Core network elements or entities (or core network elements or entities). The eNB may be referred to as a radio access network (RAN) element or entity.

Serving base station may refer to the base station currently handling communication needs of the UE.

Figure 1A:
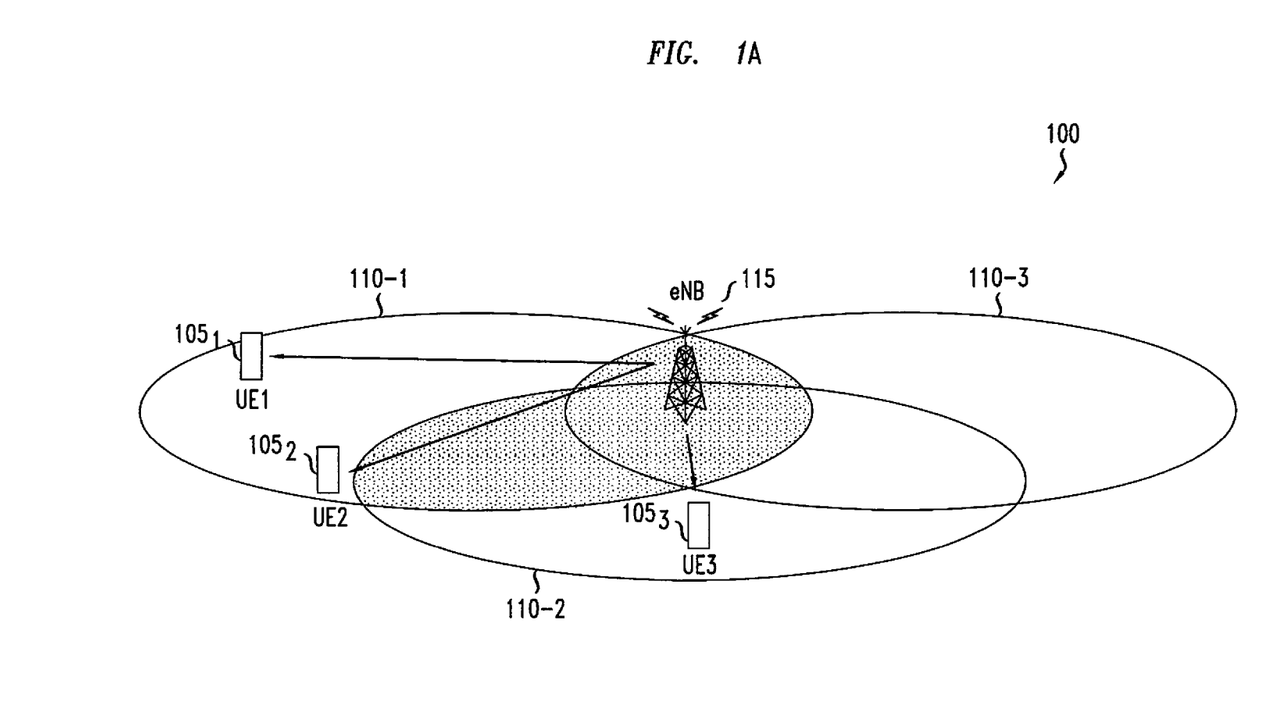
FIG. 1A illustrates a wireless communication network according to an example embodiment.

FIG. 1A illustrates a wireless communication network according to an example embodiment.

FIG. 1A illustrates a wireless communication network 100 including at least one eNodeB 115 which may communicate with an access gateway (not shown). The network may be a Long Term Evolution (LTE) network.

The access gateway is also communicatively coupled to a core network (CN) that is, in turn, communicatively coupled to one or more external networks, such as the Internet and/or other circuit and/or packet data networks. Based on this arrangement, the network 100 communicatively couples user equipments (UEs) $105_1$-$105_N$ to each other and/or to other user equipments or systems accessible via external networks.

As shown, the network 100 includes the eNB 115. However, it should be understood that the network 100 may include more than one eNB 115.

The eNB 115 provides the Evolved Universal Terrestrial Radio Access (E-UTRA) user plane (PDCP/RLC/MAC/PHY) and radio resource control (RRC) plane protocol terminations with user equipments (UEs) 105.

As discussed herein, the eNodeB 115 refers to a base station that provides radio access to UEs 105 within given coverage areas (e.g., 110-1, 110-2, 110-3). These coverage areas are referred to as cells. As is known, multiple cells are often associated with a single eNodeB. The eNB 115 may be considered a multiple user (MU)-multiple input multiple output (MIMO) base station and, as a result, can simultaneously provide backhaul connections to the cells 110-1, 110-2, 110-3.

In another embodiment, a single cell may be associated with a single eNB.

As discussed herein, base stations (e.g., eNodeB) may have all functionally associated with conventional, well-known base stations in addition to the capability and functionality to perform the methods discussed herein.

Because the eNB 115 can operate MU-MIMO, the eNB 115 may communicate with the UEs $105_1$-$105_3$ at a same time and frequency. However, the communications between the eNB 115 and the UEs $105_1$-$105_3$ may interfere with each other. For example, a downlink signal from the eNB 115 to the UE $105_1$ may be interfered by signals from the eNB 115 to the UEs $105_2$ and $105_3$. In such a case, the UE $105_1$ is considered a victim UE and the UEs $105_2$ and $105_3$ are interfering UEs.

Cells can be in the same site (intra-site) or different sites (inter-site). Interference between UEs can occur in inter-site cells or intra-site cells.

As stated above, Network Assisted Interference Cancellation & Suppression (NAICS) was introduced where the network provides assistance information (NA-Info) in the form of transmission parameters from an interferer cell to a victim cell. The targeted scenario was for inter-site cells and hence the NA-info consists of semi-static parameters.

Figure 1B:
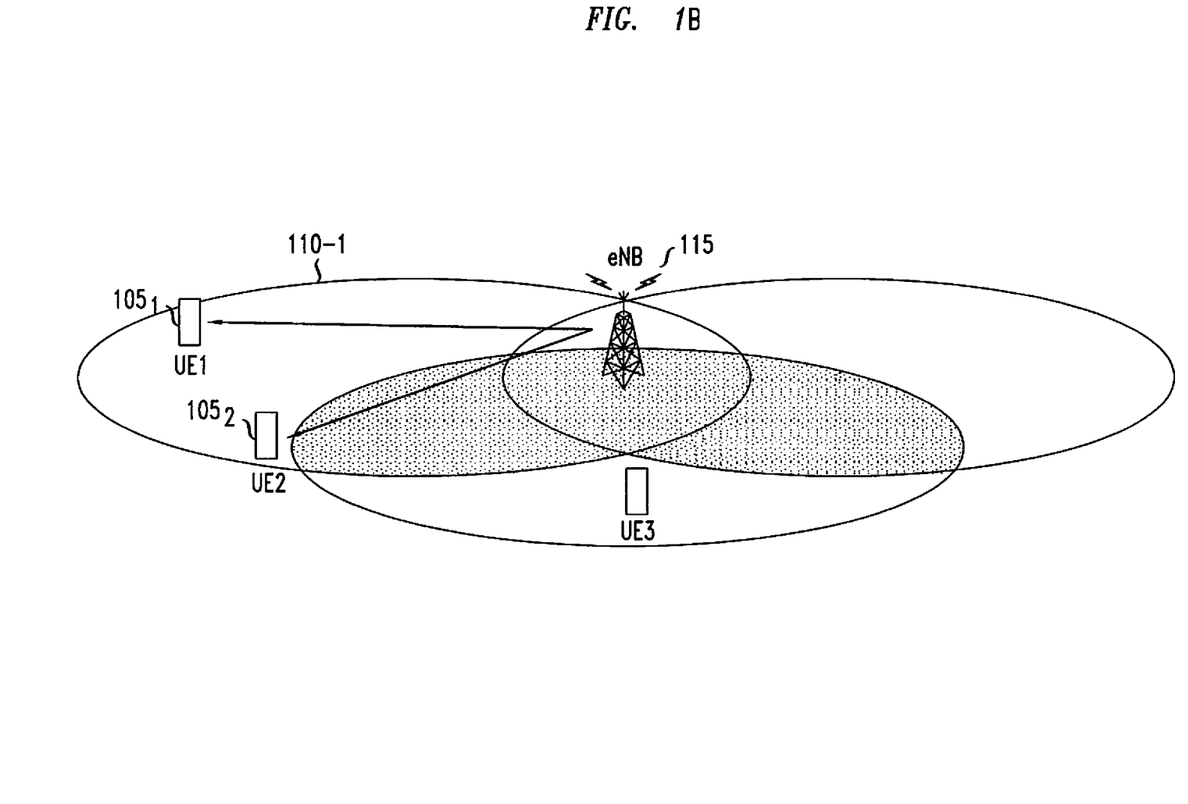
FIG. 1B illustrates an example embodiment of intra-site cell interference.

FIG. 1B illustrates an example embodiment of intra-site intra-cell interference. In FIG. 1B, the UE $105_1$ and the UE $105_2$ are in the same cell 110-1. Moreover, the UE $105_1$ and the UE $105_2$ are paired for MU-MIMO transmission. The interference on communications between the UE $105_1$ and the eNB 115 that is caused by communications between the eNB 115 and the UE $105_2$ (and vice versa) is referred to as intra-cell interference because the UEs $105_1$ and $105_2$ are in the same cell 110-1.

NA-info regarding the operation of the UE $105_2$ can be passed to the UE $105_1$ thereby allowing the UE $105_1$ to cancel interference from the UE $105_2$.

Figure 1C:
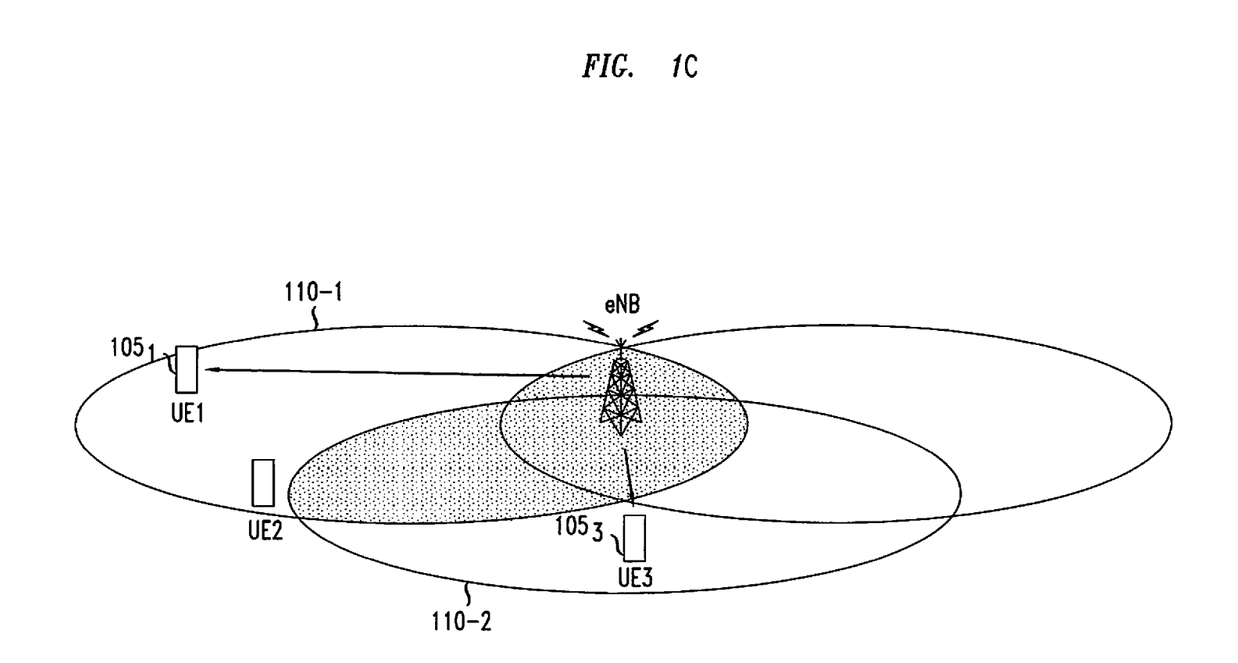
FIG. 1C illustrates an example embodiment of inter-cell interference.

FIG. 1C illustrates an example embodiment of inter-cell interference, where the cells are in the same site. In FIG. 1C, the UE $105_1$ and the UE $105_3$ are in cells 110-1 and 110-2, respectively. The UE $105_1$ and the UE $105_3$ are scheduled for physical downlink shared channel (PDSCH) in the same resource. The interference on communications between the UE $105_1$ and the eNB 115 that is caused by communications between the eNB 115 and the UE $105_3$ (and vice versa) is referred to as inter-cell interference because the UEs $105_1$ and $105_3$ are in different cells.

NA-info regarding transmissions of the UE $105_3$ can be signaled to the UE $105_1$ thereby enabling the UE $105_1$ to cancel interference from the UE $105_3$.

Figure 2A:
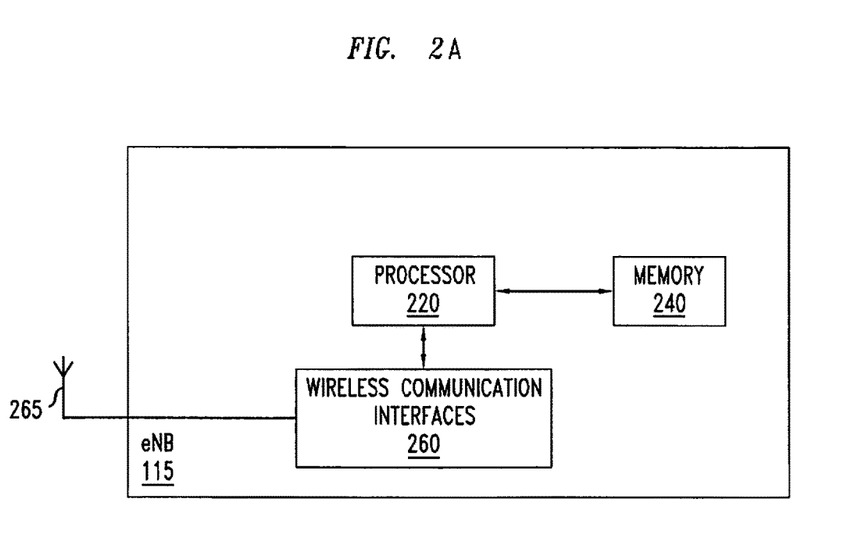
FIG. 2A illustrates an example embodiment of an eNB.

FIG. 2A illustrates an example embodiment of the eNB 115. FIG. 2 illustrates one example of the eNB 115. As shown, the eNB 115 includes a processor 220, connected to a memory 240, various interfaces 260, and an antenna 265. As will be appreciated, depending on the implementation of the eNB 115, the eNB 115 may include many more components than those shown in FIG. 2. However, it is not necessary that all of these generally conventional components be shown in order to disclose the illustrative example embodiment.

The memory 240 may be a computer readable storage medium that generally includes a random access memory (RAM), read only memory (ROM), and/or a permanent mass storage device, such as a disk drive. The memory 240 also stores operating system and any other routines/modules/applications for providing the functionalities of the eNB 115 (e.g., functionalities of a base station, methods according to the example embodiments, etc.) and to be executed by the processor 220. These software components may also be loaded from a separate computer readable storage medium into memory 240 using a drive mechanism (not shown). Such separate computer readable storage medium may include a disc, tape, DVD/CD-ROM drive, memory card, or other like computer readable storage medium (not shown). In some example embodiments, software components may be loaded into memory 240 via one of the various interfaces 260, rather than via a computer readable storage medium.

The processor 220 may be configured to carry out instructions of a computer program by performing the basic arithmetical, logical, and input/output operations of the system. Instructions may be provided to the processor 220 by the memory 240.

The various interfaces 260 may include components that interface the processor 220 with the antenna 265, or other input/output components. As will be understood, the interfaces 260 and programs stored in the memory 240 to set forth the special purpose functionalities of the eNB 115 will vary depending on the implementation of the eNB 115.

Figure 2B:
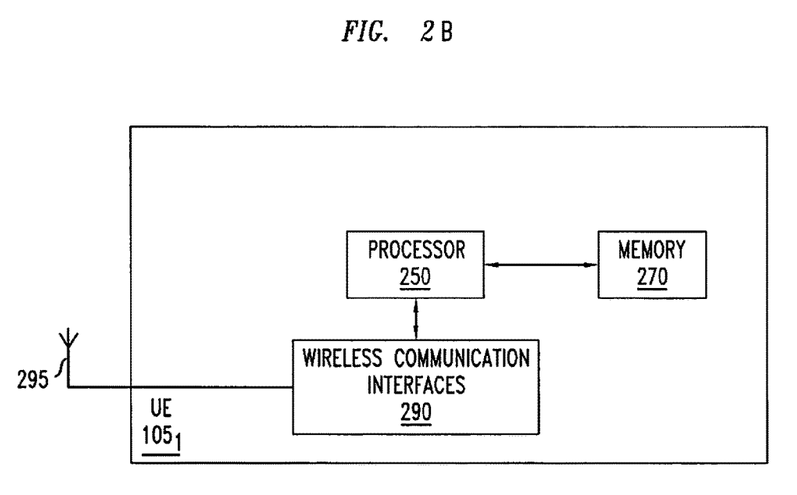
FIG. 2B illustrates an example embodiment of a UE.

FIG. 2B illustrates one example of the UE$105_1$. While only the UE$105_1$ is shown, it should be understood that the UEs $105_2$ and $105_3$ have a similar or same structure.

As shown, the UE$105_1$ includes a processor 250, connected to a memory 270, various interfaces 290, and an antenna 295. As will be appreciated, depending on the implementation of the UE$105_1$, the UE$105_1$ may include many more components than those shown in FIG. 3. However, it is not necessary that all of these generally conventional components be shown in order to disclose the illustrative example embodiment.

The memory 270 may be a computer readable storage medium that generally includes a random access memory (RAM), read only memory (ROM), and/or a permanent mass storage device, such as a disk drive. The memory 270 also stores operating system and any other routines/modules/applications for providing the functionalities of the UE$105_1$ (e.g., functionalities of a UE, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the basic arithmetical, logical, and input/output operations of the system. Instructions may be provided to the processor 250 by the memory 270.

The various interfaces 290 may include components that interface the processor 250 with the antenna 295, or other input/output components. As will be understood, the interfaces 290 and programs stored in the memory 270 to set forth the special purpose functionalities of the UE$105_1$ will vary depending on the implementation of the UE$105_1$.

For the purposes of explanation only, the embodiments will be described with respect to the Long Term Evolution (LTE) standard. Accordingly, the well-known terminology associated with LTE will be used describing the example embodiments.

Next, operation according to example embodiments will be described.

An advantage in intra-site NAICS is that dynamic NA-info can be signaled to a victim UE compared to inter-site NAICS in 3GPP Release 12 since there is no backhaul delay in intra-site NAICS. Because the eNB 115 has knowledge of dynamic scheduling information for all victim and interfering UEs (e.g., $105_1$-$105_3$). Unlike semi-static NA-info in Release 12, dynamic NA-info avoids blind decoding at the UE and subset restrictions at the interfering cell. More specifically, the dynamic NA-info avoids blind decoding since dynamic parameters used by the interfering UE can be dynamically signaled to the victim UE.

In other words, the reason for blind decoding is for an eNB to maintain some flexibility. For example the eNB should freely schedule a UE using QPSK, 16 QAM or 64 QAM. These scheduling parameters are dynamic (i.e. made on the fly for the same subframe). It is difficult to send such info in advance. To maintain such flexibility, the UE would have to blind decode (e.g. try all possible scenarios, in this case try QPSK, 16 QAM and 64 QAM and decide which is the right one). For some parameters, it is difficult for a UE to blind decode, an example is transmission mode (there are 10 of them) and so a compromise is made where the eNB restricts the number of transmission mode to say 6 and tells the victim UE which one it will use. In dynamic NA-info all this information can be sent to the UE dynamically and so the UE does not need to blind decode.

Furthermore, the eNB 115 may provide dynamic NA-info to the UEs $105_1$-$105_3$ that include additional parameters such as transport block size (TBS) thereby allowing advanced receivers used in UEs $105_1$-$105_3$ to perform interference cancellation, for example at the codeword level. However, the amount of information used to perform interference cancellation in advance receivers such as codeword level interference cancellation can be high.

Accordingly, example embodiments provide methods and systems that reduce an amount of information used by a victim UE to perform interference cancellation.

In UMTS it has been proposed for the UE ID of an interfering UE to be sent to the victim UE. The victim UE can then decode the control information (e.g. HS-SCCH) of the interfering UE to obtain the scheduling info.

However, the UE ID is usually long, e.g., in Long Term Evolution the UE ID (C-RNTI) is 16 bits. Moreover, multiple UE IDs may be needed per transmission time interval (TTI), which adds overhead to the DCI. Extending the DCI by an amount to include the UE ID(s) of interfering UE(s) would reduce the robustness of the DCI message and the coverage of the PDCCH/EPDCCH control channel. Furthermore, a UE ID, such as a Radio Network Temporary Identifier (RNTI) is not used to scramble the PDCCH/EPDCCH, which carries the scheduling information.

In an example embodiment, the eNB 115 provides at least two DCI to a victim UE (e.g., UE $105_1$) in the control channel. The control channel may be either a PDCCH or EPDCCH. Each DCI is carried in a PDCCH/EPDCCH candidate.

A first DCI may be referred to as the DCI for a downlink signal intended for the victim UE, or simply as the "victim DCI." Moreover, a second DCI may be referred to as the DCI containing scheduling information of the interfering UE's PDSCH, or simply as Network Assisted DCI (NA-DCI).

The NA-DCI contains scheduling information of at least one interfering UE. The victim UE can therefore use the NA-DCI to decode the signal to the interfering UE and by doing so cancels the interference caused by the interfering UE.

The victim DCI is scrambled by the eNB 115 as described in 3GPP TS 36.211, Release 12, since the victim DCI is intended for the victim UE. The entire contents of 3GPP TS 36.211, Release 12, are hereby incorporated by reference.

The NA-DCIs are scrambled by the eNB 115 using a network assisted identification (NA-ID). For example, the eNB 115 uses a different NA-ID for each NA-DCI when scrambling the NA-DCI.

The NA-ID is a number that spans 9 bits. The NA-ID can be number assigned by the eNB 115 and can correspond to a single UE or cell specific.

The scrambling function using the NA-ID to generate the NA-DCI is the same function as described in TS 36.211. The NA-ID may be referred to as an identifier of DCI (victim DCI and NA-DCI).

In one example embodiment, the format of the NA-DCI should follow that of the interfering UE since NA-DCI contains scheduling info for the interfering UE. In another example embodiment, the eNB 115 may reuse the existing DCI format of the victim DCI for the NA-DCI, thereby maintaining simplicity. For example, the format of NA-DCI informed to the victim UE is the same with the victim DCI.

Figure 3:
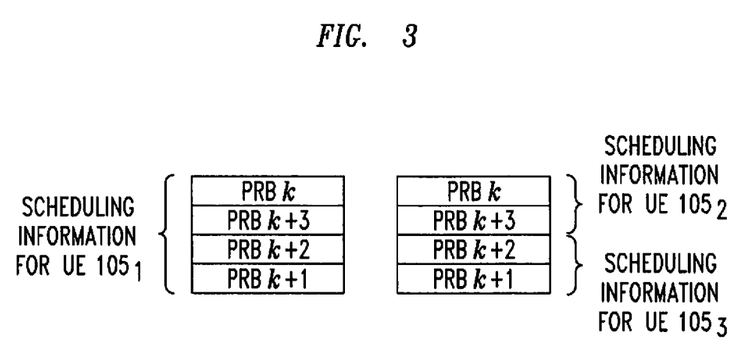
FIG. 3 illustrates an example embodiment of scheduled transmissions for a victim UE versus scheduled transmissions for interfering UEs.

FIG. 3 illustrates an example embodiment of scheduled transmissions to the victim UE (e.g., UE $105_1$) versus scheduled transmissions to the interfering UEs (e.g., UEs $105_2$ and $105_3$) for the PDSCH. As shown in FIG. 3, the UE $105_1$ is scheduled on 4 PRBs: PRB k, PRB k+1, PRB k+2, PRB k+3. In PRB k and PRB k+1, the UE $105_1$ is being interfered by the UE $105_2$ because the UE $105_2$ is also scheduled by the eNB 115 on PRB k and PRB k+1. In PRB k+2 and PRB k+3, the UE $105_1$ is being interfered by the UE $105_3$ because the UE $105_3$ is also scheduled by the eNB 115 on PRB k+2 and PRB k+3.

The NA-ID to scramble and descramble the NA-DCI can be semi-statically configured by the eNB 115, e.g., via RRC signaling. Multiple NA-IDs may be used by the eNB 115 because the victim UE may be interfered by more than one interfering UE.

For example, with two NA-DCIs, the eNB 115 may use two separate NA-IDs. The eNB 115 may use a first NA-ID corresponding to one NA-DCI containing scheduling information on the interfering UE $105_2$ for the scrambling function and a second NA-ID corresponding to a NA-DCI containing scheduling information on the interfering UE $105_3$ for the scrambling function. The eNB 115 signals the first and second NA-IDs for descrambling and removing the interference.

The scrambling sequence is generated from a scrambling sequence as described in TS 36.211 using the NA-ID as the input. The DCI messages are scrambled by the eNB 115 using the generated scrambling sequence before being transmitted by one of multiple PDCCH/EPDCCH candidates. The UE will use the same scrambling sequence to try to decode each candidate PDCCH/EPDCCH for the DCI messages.

Figure 4:
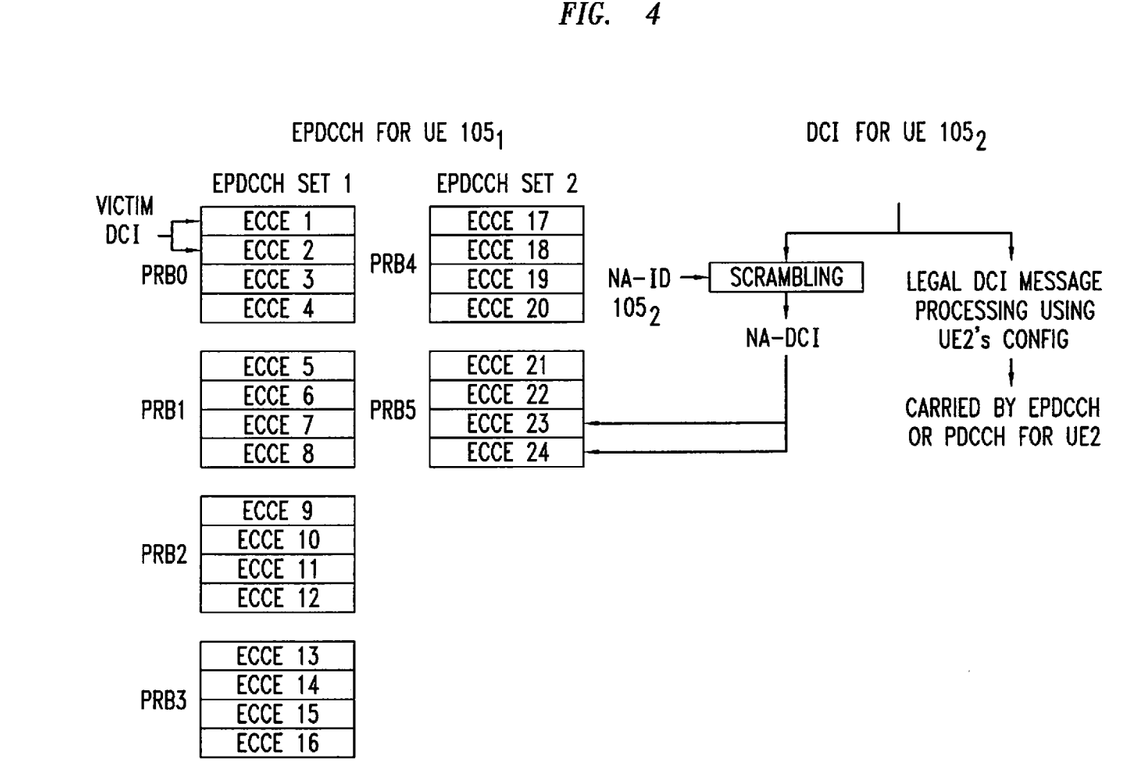
FIG. 4 illustrates a method of adding NA-DCI to a search space for a victim UE, according to an example embodiment.

FIG. 4 illustrates a method of adding the NA-DCI to a search space for the victim UE in the EPDCCH, according to an example embodiment.

Referring back to FIG. 1A, the UEs $105_1$ and UE $105_2$ are served by the cell 110-1 and the UE $105_3$ is served by the cell 110-2. The cells 110-1 and 110-2 are intra-site cells.

The cell 110-1 performs MU-MIMO transmission pairing the UEs $105_1$ and UE $105_2$ while the cell 110-2 transmits to the UE $105_3$. The PRBs used for the UEs $105_2$ and UE $105_3$ overlap those used for the UE $105_1$ in the PDSCH, as shown in FIG. 3.

More specifically, the PRBs PRB k, PRB k+1, PRB k+2, PRB k+3 in FIG. 3 are for the PDSCH while the PRBs PRB0-PRB5 in FIG. 4 are for the EPDCCH. It should be noted that the PRBs for the EPDCCH need not be contiguous, the PRBs PRB0-PRB5 can be any five PRBs in the system bandwidth. The PDSCH PRBs PRB k, PRB k+1, PRB k+2, PRB k+3 in FIG. 3 are the ones used for performing the cancellation.

In the example shown in FIG. 4, the UE $105_2$ causes a higher interference for UE $105_1$, compared to the UE $105_3$, due to MU transmission.

In the example shown in FIG. 4, the eNB 115 uses the EPDCCH to carry the victim DCI and the NA-DCI.

Two sets of PRBs containing EPDCCH candidates are configured to carry the victim DCI for UE1. One set (Set 1) includes PRB0-PRB3 and the other set (Set 2) includes PRB4-PRB5. Each PRB0-PRB5 includes a set of Enhanced Control Channel Elements (ECCEs) ECCE1-ECCE4, ECCE5-ECCE8, ECCE9-ECCE12, ECCE13-ECCE16, ECCE17-ECCE20 and ECCE21-ECCE24.

The victim DCI in the EPDCCH is scrambled by the eNB 115 using $n_{ID,m}^{EPDCCH}$ as described in 3GPP TS 36.211, Release 12 where $n_{ID,m}^{EPDCCH}$ is an index value associated with the UE $105_1$. The eNB 115 uses an aggregation level=2 occupying ECCE1 & ECCE2 to transmit the victim DCI in Set 1 of the EPDCCH of the UE.

Moreover, the eNB 115 provides the UE $105_1$ with an NA-ID to descramble the NA-DCI which contains scheduling information of the interferer, e.g., UE $105_2$. The eNB 115 may use RRC to provide the victim ID with the NA-ID, for example.

The NA-ID associated with NA-DCI containing scheduling information of UE $105_2$ is used as an input for the scrambling of the DCI by the eNB 115 to generate the NA-DCI associated with the DCI for the UE $105_2$. In other words, for the UE $105_2$, the DCI for the UE $105_2$ uses a traditional ID (e.g., $n_{ID,m}^{EPDCCH}$) since this is the DCI intended for the UE $105_2$ for its own signal. The NA-ID is used to scramble the DCI containing scheduling info for the UE $105_2$ but transmitted to the UE $105_1$. A cyclic redundancy check (CRC) of the NA-DCI can be masked with RNTI of the victim UE, i.e. RNTI for UE $105_1$.

In addition, the DCI for UE $105_2$ is scrambled as described in 3GPP TS 36.211 for UE $105_2$ and carried by the control channel for the UE $105_2$.

In the example of FIG. 4, the eNB 115 transmits the NA-DCI in Set 2 of the EPDCCH. More specifically, the eNB 115 transmits the NA-DCI in ECCE23-ECCE24 (i.e. with aggregation level=2) in Set 2 of the EPDCCH of UE $105_1$. As a result, the NA-DCI may be contained in a same search space as the victim DCI. In other words, the PDCCH/EPDCCH candidates containing the NA-DCI are the same candidates containing the victim DCI.

However, it should be understood that the NA-DCI may be placed in other search spaces by the eNB 115. For example, the NA-DCI's PDCCH/EPDCCH search space is a subset of that used for PDCCH/EPDCCH of the victim DCI. This reduces the number of blind decodes for the UE in obtaining the NA-DCI. For example the NA-DCI is only located in Set 2 of the EPDCCH in FIG. 4.

In another example embodiment, a separate PDCCH/EPDCCH search space is used by the eNB 115 for the NA-DCI containing the scheduling information of the interfering UE. The search space for NA-DCI may partially overlap that of search space for the victim DCI.

The eNB 115 can send the victim DCI in either EPDCCH set (Set 1 or Set 2). That is the search space for NA-DCI is a subset of that of victim DCI. The eNB 115 informs the victim UE of the search space for the NA-DCI using RRC signaling.

In example of FIG. 4, only a single NA-ID and a single NA-DCI is configured for this UE. Consequently, the victim UE $105_1$ would only perform 1 extra blind decoding for EPDCCH for the interfering UE $105_2$.

In the example of FIG. 4, the victim UE $105_1$ first blindly decodes for the victim DCI using the legacy EPDCCH ID, i.e. $n_{ID,m}^{EPDCCH}$ for the initialization of the scrambling function. The UE $105_1$ performs blind decoding and extracts its own DCI (victim DCI). The UE $105_1$ can, therefore, decode the corresponding shared channel PDSCH.

The victim UE $105_1$ then performs a second blind decode for NA-DCI only on Set 2 of the EPDCCH since the victim UE $105_1$ has been informed by Cell1 that the NA-DCI will only be found in Set 2 of the EPDCCH. The victim UE $105_1$ uses NA-ID for the initialization of the scrambling function.

As a result, the victim UE $105_1$ obtains the DCI information for the interfering UE $105_2$ and, thereby, the scheduling information for the interfering UE $105_2$. The victim UE $105_1$ then cancels interference of the PDSCH from the interfering UE $105_2$ in PRB k and PRB k+1, which are shown in FIG. 3.

It should be noted that example embodiments are not limited to an EPDCCH search space and that eNB 115 can configure the UE $105_1$ to look for the NA-DCI only in the PDCCH search space using the NA-ID.

In an example embodiment, the NA-DCI contains the same information as the DCI used for the interfering UE $105_2$. That is the DCI of the interfering UE is sent twice by the eNB 115, one copy to the interfering UE $105_2$ and another to the victim UE $105_1$ in the form of NA-DCI scrambled by pre-configured NA-ID. In this case, the victim UE $105_1$ may have to blindly decode the transmission mode and associated DCI format of the NA-DCI which may be different from that of the victim DCI.

In another example embodiment, the NA-DCI contains information for more than one interfering UE. NA-DCI can contain common information for two or more interfering UEs. For example, demodulation of each PRB for one interfering UE may be blindly decoded. For example, in FIG. 3, if the interfering UEs $105_2$ and $105_3$ share the same modulation, a single NA-DCI can be signaled to the victim UE $105_1$ by the eNB 115 with common modulation information if the victim UE $105_1$ is only capable of symbol level interference cancellation. The number of NA-DCI messages conveyed to the victim UE and the blind decoding required for victim UE, i.e. victim UE only needs to blind decode for a single NA-DCI rather than multiple ones, are reduced.

In another example embodiment, the victim DCI contains an indication whether the victim UE $105_1$ needs to decode a NA-DCI. The indication also indicates a number of extra NA-DCIs that have been informed to the victim UE $105_1$.

The victim UE $105_1$ may try to blindly decode the NA-DCI within a preconfigured UE-specific search space if the victim UE $105_1$ has been indicated with multiple NA-IDs by the eNB 115.

Figure 5:
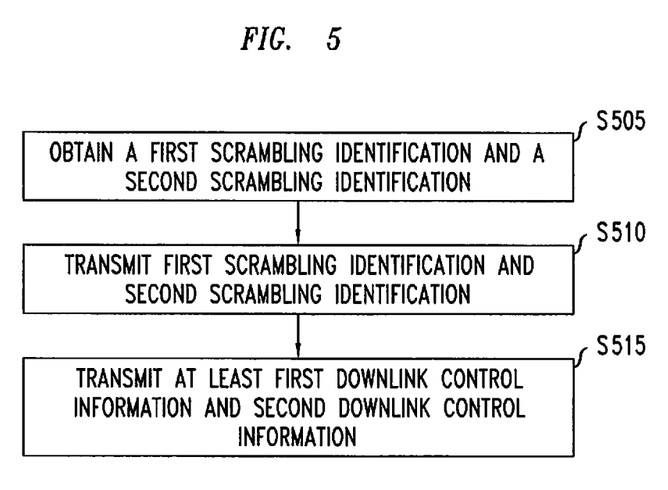
FIG. 5 illustrates a method of transmitting control information according to an example embodiment.

FIG. 5 illustrates a method of transmitting control information according to an example embodiment. It should be understood that the method of FIG. 5 may be implemented by the eNB 115 using the functionality described above.

At S505, the eNB 115 obtains first and second scrambling identifications such as the $n_{ID,m}^{EPDCCH}$ and NA-ID. At S510, the eNB 115 transmits the first and second scrambling identifications to a victim UE. Then, at S515, the eNB 515 transmits at least first downlink control information (e.g., victim DCI) and second downlink control information (e.g., NA-DCI) to the victim UE.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A system comprising:
a network element including,
a memory storing computer-readable instructions, and
a processor configured to execute the computer-readable instructions to,
transmit at least first downlink control information and second downlink control information in a same downlink control channel transmission to a first user equipment (UE) being served by a serving cell, the first downlink control information associated with a first identification specific to the first UE and the second downlink control information associated with a second identification specific to a second UE, and the second UE being an interfering source for the first UE, wherein the second downlink control information includes scheduling information for at least one interfering UE including the second UE,
wherein the network element is configured to transmit a signal to the first UE, the signal indicates the second downlink control information is in a first candidate search space, the first candidate search space is separate from a second candidate search space, the second candidate search space being associated with the first downlink control information.

2. The system of claim 1, wherein the network element is configured to transmit the second downlink control information to the second UE.

3. The system of claim 1, wherein a structure of the first downlink control information is the same as a structure of the second downlink control information.

4. The system of claim 1, wherein the network element is configured to transmit a signal to the first UE, the signal indicates a number of downlink control information sets in a candidate search space for the first UE.

5. The system of claim 1, wherein the first identification and the second identification are different.

6. A user equipment (UE) comprising:
a memory storing computer-readable instructions, and
a processor configured to execute the computer-readable instructions to,
receive at least first downlink control information and second downlink control information from a network element in a same downlink control channel transmission, the first downlink control information specific to the UE and the second downlink control information specific to another UE, the another UE being an interfering source for the UE, the first downlink control information being different than the second downlink control information, wherein the second downlink control information includes scheduling information of a Physical Downlink Shared Channel (PDSCH) of the another UE, the processor is configured to use the second downlink control information to decode a signal to the another UE,
wherein the UE is configured to receive another signal, the another signal indicates the second downlink control information is in a first candidate search space, the first candidate search space is separate from a second candidate search space, the second candidate search space being associated with the first downlink control information.

7. The UE of claim 6, wherein the processor is configured to decode the first downlink control information using an Enhanced Physical Downlink Control Channel (EPDCCH) identification and the processor is configured to decode the second downlink control information based on the first candidate search space.

8. The UE of claim 6, wherein the processor is configured to decode the first downlink control information using a Physical Downlink Control Channel (PDCCH) identification and the processor is configured to decode the second downlink control information based on the first candidate.

9. A method of transmitting control information, the method comprising:
obtaining a first identification specific to a first user equipment (UE) and a second identification specific to a second UE, the second UE being an interfering source for the first UE;
transmitting the first identification and the second identification to the first UE;
transmitting at least first downlink control information and second downlink control information to the first UE in a same downlink control channel transmission, the first downlink control information being associated with the first identification and the second downlink control information being associated with the second identification, wherein the second downlink control information includes scheduling information for the second UE; and
transmitting a signal to the first UE, the signal indicating the second downlink control information is in a first candidate search space, the first candidate search space is separate from a second candidate search space, the second candidate search space being associated with the first downlink control information.

10. The method of claim 9, wherein the network element is configured to transmit the second downlink control information to the second UE.

11. The method of claim 9, wherein a structure of the first downlink control information is the same as a structure of the second downlink control information.

12. The method of claim 9, wherein the transmitting the at least first downlink control information and second downlink control information transmits a signal to the first UE, the signal indicates a number of downlink control information sets in a candidate search space for the first UE.

13. The method of claim 9, wherein the first identification and the second identification are different.

14. The system of claim 1, wherein processor configured to execute the computer-readable instructions to,
   transmit the first identification specific to the first UE and the second identification specific to the second UE using radio resource control (RRC) signaling.

15. The system of claim 14, wherein processor configured to execute the computer-readable instructions to,
   generate the first downlink control information and the second downlink control information using the first identification and the second identification, respectively.

16. The UE of claim 6, wherein processor configured to execute the computer-readable instructions to,
   receive the first identification specific to the first UE and the second identification specific to the second UE using radio resource control (RRC) signaling.

17. The UE of claim 16, wherein processor configured to execute the computer-readable instructions to,
   decode the first downlink control information and the second downlink control information using the first identification and the second identification, respectively.

18. The method of claim 9, wherein the transmitting transmits the first identification and the second identification using radio resource control (RRC) signaling.

19. The method of claim 18, further comprising:
   generating the first downlink control information and the second downlink control information using the first identification and the second identification, respectively.

* * * * *